(12) United States Patent
Wallace

(10) Patent No.: US 7,645,091 B2
(45) Date of Patent: Jan. 12, 2010

(54) IRRIGATION SYSTEM

(76) Inventor: Howard Wallace, 13234 Nightsky Dr., Camarillo, CA (US) 93012

( * ) Notice: Subject to any disclaimer, the term of this patent is extended or adjusted under 35 U.S.C. 154(b) by 0 days.

(21) Appl. No.: 11/899,427

(22) Filed: Sep. 5, 2007

(65) Prior Publication Data
US 2009/0060659 A1    Mar. 5, 2009

(51) Int. Cl.
*A01G 13/00*    (2006.01)

(52) U.S. Cl. .................. 405/36; 47/2; 239/135

(58) Field of Classification Search .............. 47/2; 239/67, 69, 75, 13, 128, 135, 203, 550, 551, 239/DIG. 15; 405/36
See application file for complete search history.

(56) References Cited

U.S. PATENT DOCUMENTS 4,614,055 A * 9/1986 Day ........................ 47/2

\* cited by examiner

*Primary Examiner*—Sunil Singh

(57) ABSTRACT

An agricultural crop freeze control method and apparatus that can be effectively used to prevent growing crops such as avocado and citrus crops from freeze damage. The apparatus includes an irrigation system within which one or more commercially available tankless water heaters are installed to controllably heat the water that is delivered to the crop.

2 Claims, 1 Drawing Sheet

IRRIGATION SYSTEM

BACKGROUND OF THE INVENTION

1. Field of the Invention

The present invention relates generally to agricultural irrigation systems. More particularly, the invention concerns a novel irrigation system and its method of use that permits the agricultural grower to irrigate growing crops with water at an elevated temperature for purposes of freeze prevention.

2. Discussion of the Prior Art

Crop losses due to freeze can exceed millions of dollars per year in the United States alone. For example, in an article published by the *San Francisco Chronicle* on Wednesday, Jan. 17, 2007, recent losses of the California orange crop due to freezing conditions were estimated to exceed $1 million. These losses occurred even though many growers attempted to protect their crops through the use of wind machines and other types of preventative measures. The estimated cost for operating the wind machines were estimated to be on the order of $200 per hour of operation.

Numerous types of crops, other than oranges, are susceptible to freeze damage. For example, losses by avocado growers in California as a result of the January 2007 freezing conditions were also estimated to be an access of $1 million. Similarly, growing crops such as strawberries, tomatoes, beans, cucumbers, peppers and squash as well as vine crops and tree fruits are susceptible to substantial damage due to freezing.

The critical temperatures needed for damage to occur to growing crops varies depending on the duration that temperatures remain below freezing. For example, buds of fruit trees may be damaged if exposed to −2° C. for more than 24 hours, but may survive if exposed to −6° C. for less than 2 hours. Thawing conditions often affect the extent of damage after a frost. For example, tobacco leaves which are thawed out gradually after freezing have been known to suffer less damage than if thawing was rapid.

Various methods are currently in use by agricultural growers to protect their crops from freeze damage. The more common of these methods include the use of wind machines, the use of smudge pots, controlled irrigation at the onset of the freeze and crop covering.

With respect to the use of wind machines, it is well understood that during freezes that occur on calm, clear nights, the air layer near the ground is colder than the air aloft. With this in mind, wind machines or helicopters are sometimes used to bring the warmer air down to the crop level to replace the cold air layer at the surface. This method can be effective when there are large temperature differences between air layers near the surface and those up higher. However, as previously mentioned, equipment and operating costs are high. Effectiveness varies in the range of 1 to 4 degrees C.

With respect to the use of controlled irrigation, smudge pots and the like, smoke clouds are well-known for their ability to reduce radiative heat loss from the surface. Smoke from smudge pots or burning tires or refuse and mist from fine water nozzles have been used in attempts to reduce this heat loss. Since it is difficult to maintain the smoke over the sensitive crop area and to produce droplets the optimum size to intercept the long-wave radiation, this method is not particularly effective. In addition, in many regions environmental laws prohibit the use of methods where smoke is involved.

Covering methods reduces heat loss from the surface. However, the cost of the covering materials, such as sheets of plastic and the like, their storage and the time and labor needed to place the covers over the growing crop are the main drawbacks to this method particularly for large areas of crops. Foams have also been used experimentally to protect plants but materials and applicators are not readily available on a commercial basis. Sprinkling of the crop normally begins with the onset of freezing conditions and a film of water is attempted to be continuously maintained until temperatures have risen above the freezing level (0° C.). If sprinkling is discontinued prematurely, heat will be drawn from leaves to melt the ice and freeze damage may result. If the frost lasts too long, this method can prove quite detrimental because the plants can only support a limited amount of the added weight of ice that builds up on the leaves and branches.

It is the foregoing deficiencies of the various prior art agricultural crop freeze control methods described in the preceding paragraphs that the present invention seeks to overcome.

SUMMARY OF THE INVENTION

It is an object of the present invention to provide an agricultural crop freeze control method and apparatus that can be effectively used to prevent growing crops from freeze damage.

Another object of the invention is to provide a method and apparatus of the aforementioned character which is easy to install using readily commercially available components.

Another object of the invention is to provide a method and apparatus for agricultural crop freeze prevention that is highly effective in preventing freeze damage to various types of agricultural crops, including avocado, citrus and similar fruit crops.

Another object of the invention is to provide a method and apparatus as described in the preceding paragraph that can readily be installed by relatively unskilled workman and one that is highly reliable and operation.

Another object to the invention is to provide a method and apparatus of the class described that can be relatively inexpensively installed and relatively inexpensively operated.

DESCRIPTION OF THE INVENTION

Figure 1:
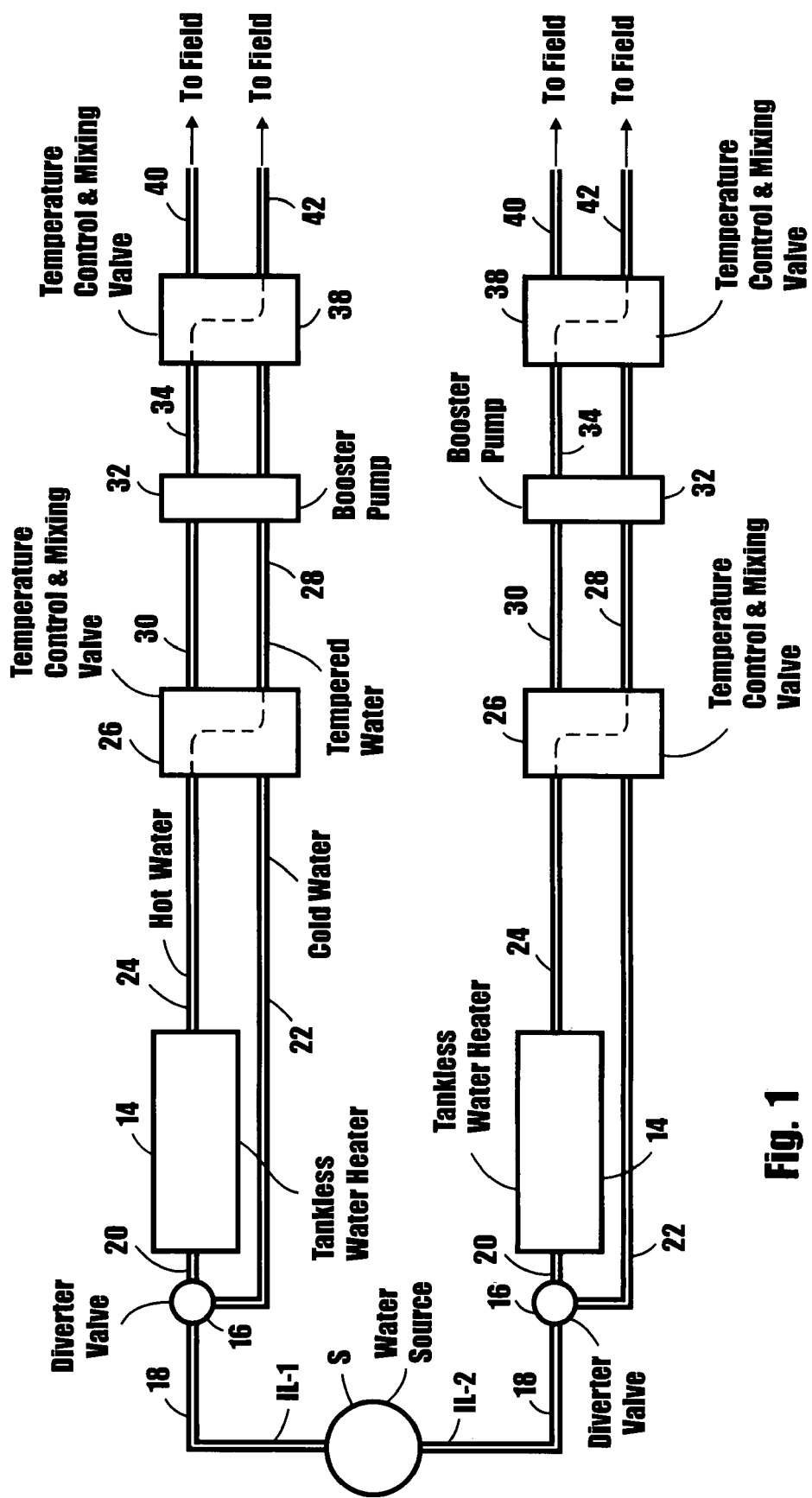
FIG. 1 is a generally diagrammatic view illustrating one form of the irrigation system of the present invention.

Referring to FIG. 1 of the drawings, one form of the irrigation system of the present invention is there illustrated. This irrigation system is particularly well-suited for use in connection with irrigating agricultural crops that are periodically exposed to freezing conditions. More particularly, this novel system permits the grower to irrigate a growing crop at critical times with controllably heated water in a manner to protect the crop from freezing.

In the present form of the invention the irrigation system comprises a plurality of irrigation lines each of which is interconnected in a conventional manner with a source of irrigation water "S". For sake of clarity, the construction and operation of only one of the two identical irrigation lines IL-1 and IL-2 will be described hereinafter.

A unique feature of the irrigation system of the invention as shown in FIG. 1 comprises the provision of one or more conventional tankless water heaters generally identified in the drawing by the numeral 14. Interposed between the source of water "S" in the tankless water heater 14 is a conventional diverter valve 16 that functions to mix the water flowing through a conventional irrigation line segment 18 into two cold water flow components. One cold water flow component is directed toward the tankless water heater 14 via a stub line segment 20 and the second flow component is directed into a cold water irrigation line segment generally designated by the numeral 22.

Diverter valve 16, which can be manually or electrically operated, is of a character well understood by those skilled in the art and is readily commercially available from several sources including the Salina Vortex Corporation of Salina, Kans. Similarly, tankless water heater 14 is of conventional construction and is readily commercially available from several sources, such as Rinnal America Corporation of Peachtree, Ga. and the Bosh Company of Londonderry, N.H.

Tankless water heaters, such as water heater 14, directly heat the water without the use of a storage tank. Therefore, they avoid the standby heat losses associated with storage water heaters and function to deliver a constant supply of hot water thereby making them ideally suited for the present application. Water heater 14 can be either an electric tankless water heater, or if desired, can be a gas-fired heater. In the electric tankless water heater an electric element heats the water. In the gas-fired tankless water heater a gas burner heats the water.

As indicated in FIG. 1, the first cold water flow component flowing from the diverter valve flows into the tankless water heater 14 wherein the cold water is controllably heated to produce a first heated water flow component. From the tankless water heater 14 the heated water flow component flows via a heated water irrigation line segment 24 toward a temperature control and mixing valve 26. Similarly, the second cold water flow component that is flowing from the diverter valve 16 is also directed to the temperature control and mixing valve via the irrigation line segment 22.

Temperature control and mixing valve 26, which can be manually or electrically controlled, is of a conventional construction well understood by those skilled in the art and is readily commercially available from several sources including the Jordan Valve Co. of Cincinnati, OH and the California Hydronics Corporation of Hayward, Calif. Mixing valves, such as valve 26, are designed to combine the flows of two or more inlets and to regulate and dispense hot and cold water received from two inlets. In most cases, a temperature sensitive element is employed, which expands or contracts depending upon the temperature coming into the valve. The element is geared to dispense water within a certain temperature range, so its expansion and contraction will vary from the cold side to the hot side to maintain the desired temperature balance. Once the water temperature is balanced, it can be dispensed into selected outlet lines, such as irrigation line segments 28 and 30 (see FIG. 1).

As indicated in FIG. 1, water following from the temperature control and mixing valve 26 via irrigation line segments 28 and 30, flows into a conventional booster pump 32. Booster pump 32, which is of construction well understood by those skilled in the art and which is readily commercially available from various sources including King Pumps, Inc of Miami, Fla., functions to boost the fluid pressure within line segments as may be necessary to obtain the desired rate of flow of controllably heated water to the crop field.

If desired, the controllably heated water flowing from the booster pump 32 can be directed into a second temperature control and mixing valve 38 which can be used to further regulate the temperature of the water flowing toward the crop field. Field water irrigation line segments 40 and 42 that are interconnected with the temperature control and mixing valve 38 receive the warm water flow component from the mixing valve and deliver it to the growing crop.

With respect to the method for irrigating a growing crop using an irrigation system of the character described in the preceding paragraphs, the first step in carrying out the method of the invention is to operate the diverter valve in a manner to divide the flow of water from the source of irrigation water into first and second cold water flow components. This done, the tankless water heater valve is used in a manner well understood by those skilled in the art to controllably heat the water of the first water flow component to produce a first heated water flow component. Next, the temperature control and mixing valve is used in a manner well understood by those skilled in the art to mix the first heated water flow component with the second cold water flow component to produce a warm water flow component. Through the use of field water irrigation lines, such as line segments 38 and 40, the warm water flow component is uniformly distributed to the growing crop by means of conventional drip irrigation systems, conventional sprinkler systems and the like.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim

1. An irrigation system for delivering water from a source of irrigation water under pressure to a crop field comprising an irrigation line having an inlet interconnected with the source of irrigation water and an outlet for distributing water to the crop field and a tankless water heater disposed intermediate said inlet and set outlet of said irrigation line for producing a heated water flow component flowing toward said outlet of said irrigation line without the use of a storage tank, said irrigation system comprising:

a) an electrically operated diverter valve disposed within said irrigation line intermediate the source of irrigation water and said tankless water heater for controllably dividing the irrigation water into first and second cold water flow components;

b) a cold water irrigation line segment for interconnecting said diverter valve with said tankless water heater;

c) a heated water irrigation line segment interconnected with said tankless water heater for receiving said heated water flow component produced by said tankless water heater; and d) a temperature control and mixing valve interconnected with said cold water irrigation line segment and with said heated water irrigation line segment for mixing said heated water flow component and said second cold water flow components to produce a warm water flow component and a field water irrigation line segment interconnected with said temperature control and mixing valve for receiving said warm water flow component and delivering warm water to the crop.

2. The irrigation system as defined in claim 1 in which said temperature control and mixing valve includes a temperature sensitive element which expands or contracts depending upon the temperature of the water coming into said temperature control and mixing valve.

\* \* \* \* \*